Patented Sept. 8, 1931

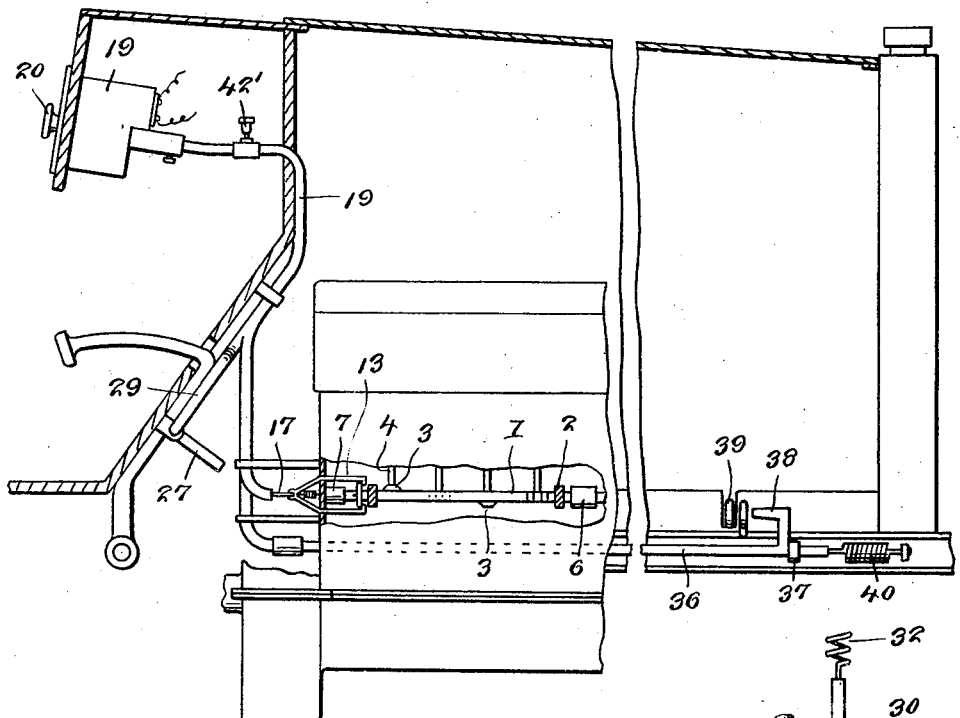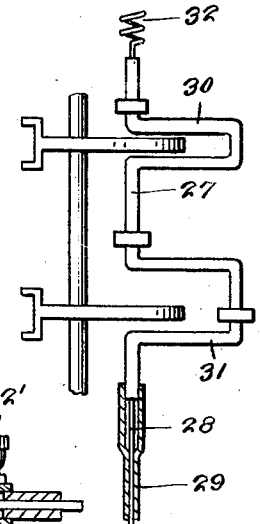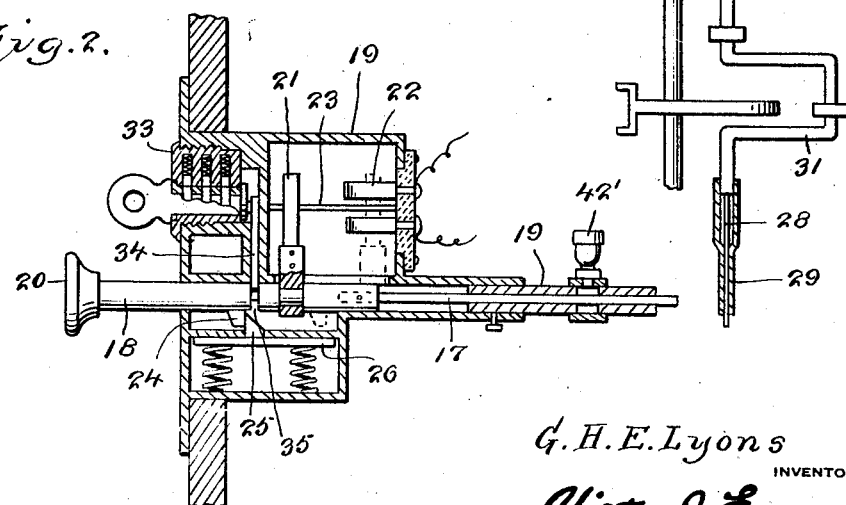

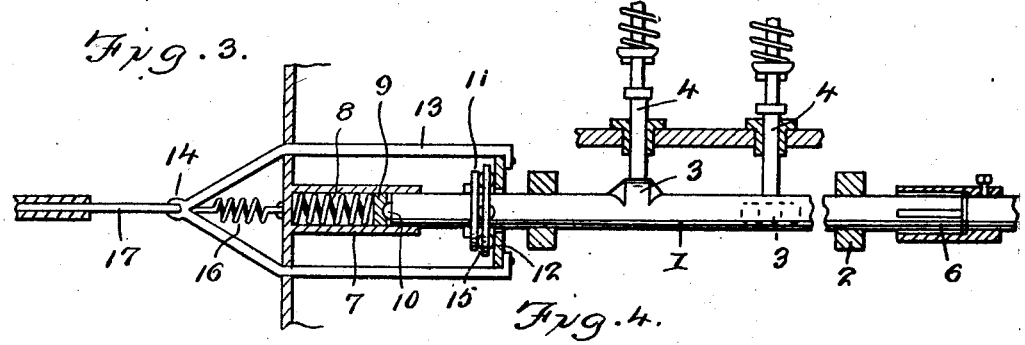
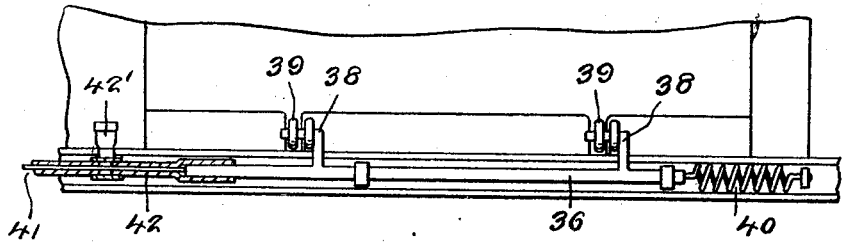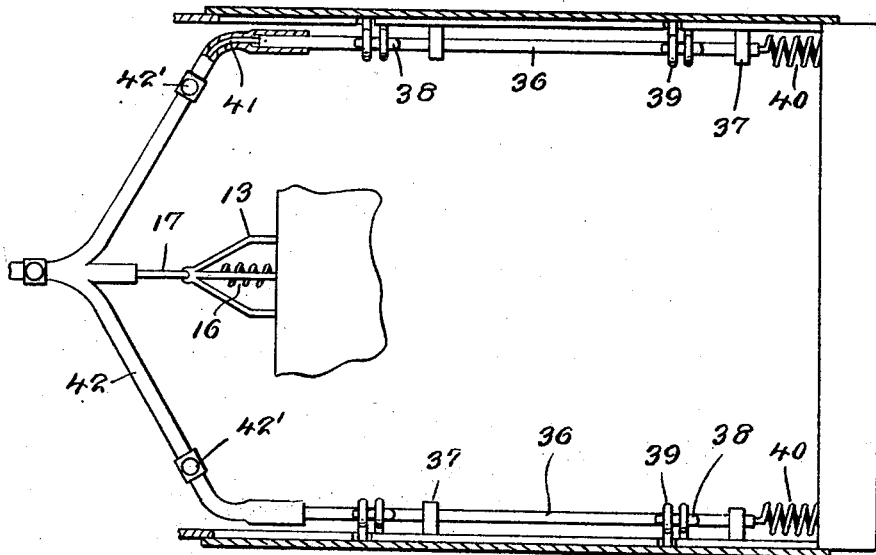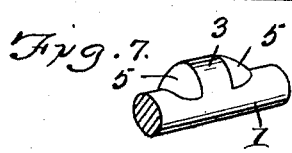

1,822,157

UNITED STATES PATENT OFFICE

GEORGE H. E. LYONS, OF DAYTON, OHIO

EMERGENCY STOPPING DEVICE FOR AUTOMOBILES

Application filed March 10, 1930. Serial No. 434,801.

This invention relates to an emergency stopping device and locking means for motor vehicles, and the general object of the invention is to provide means for moving the cams of the cam shaft from under the valve tappets so that the valves will all close, thus causing the motor to act as a brake for the vehicle, and at the same time open the ignition circuit so the mixture in the cylinders will not be fired, the invention also acting to prevent unauthorized use of the vehicle.

A further object of the invention is to provide means for preventing the parts being tampered with in an attempt to move the parts to operative or normal position again after the invention has been set to prevent movement of the vehicle.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a vertical sectional view through the front part of a motor vehicle, showing the invention in use thereon.

Figure 2 is a vertical sectional view through the operating and locking means of the invention.

Figure 3 is an elevation, with parts in section, of the cam shaft and the parts associated therewith and showing the means for imparting movement to the shaft by the flexible member.

Figure 4 is an inside view, with parts in section, of the locking means for the hood.

Figure 5 is a horizontal sectional view through the hood and showing the locking means in plan.

Figure 6 is a detail view of the means for controlling the movement of the clutch pedal.

Figure 7 is a detail view showing the ramps on one of the cams of the cam shaft.

In these drawings, the numeral 1 indicates the cam shaft of the motor of the vehicle, and as shown in Figure 3, this shaft is slidably supported in the bearings 2 so that it can be moved longitudinally to move the cams 3 thereon from under the tappets 4 of the valves of the motor. Each cam is formed with a ramp 5 at each side thereof so that tappets can readily pass to and from the cam when the shaft is moved longitudinally. A sliding clutch 6 connects the shaft with the driving parts thereof so as to permit this longitudinal movement of the shaft. The front end of the shaft extends into a tubular part 7 attached to the front part of the motor and a spring 8 in said part tends to hold the shaft in a position with the cams under the tappets, or in its normal position. The spring bears against a disk 9 in the tubular member which is recessed to receive a rounded thrust part 10 on the front end of the shaft to reduce friction. A collar 11 is attached to the front part of the shaft and a disk 12 is attached to the rods 13 which slidingly pass through holes in the front part of the motor and have their front ends converging to an eye 14 formed at the meeting front ends of the rods. The disk 12 has a hole at its center through which the shaft passes and anti-friction bearings 15 are placed between the disk and the collar 11, to prevent sudden stoppage of the shaft when the disk is pulled forwardly by the rods in the action of moving the shaft to disengage the cams thereon from the tappets. A spring 16 connects the meeting ends of the rods with the front of the motor and tends to hold the parts with the disk or ring 12 in inoperative position.

A flexible member 17 is connected to the eye 14 and this member is connected with a plunger 18 passing through a lock casing 19 on the instrument board of the vehicle. The flexible member is enclosed by a flexible conduit 19 suitably supported from parts of the vehicle. The plunger has a head 20 thereon so the driver or operator can move the same longitudinally in order to exert a pull on the flexible member 17 to move the rods 13 forwardly and thus cause the disk 12 to move the cam shaft to a position where the cams will be out of engagement with the tappets.

When this is done, all the valves will close and the pistons of the motor will act as a brake and thus stop the vehicle. When pressure is removed from the plunger, the springs 8 and 16 will return the parts to normal position and the cams will pass under the tappets, the ramps 5 enabling the tappets to ride up upon those cams which are uppermost.

I also provide means for breaking the ignition circuit by the outward movement of the plunger so that the charges in the cylinders will not be fired when the cams are from under the tappets so that no explosions will take place in the cylinders at this time. Such means comprises a switch arm 21 rotatably arranged on a part of the plunger within the casing 19 and insulated from the plunger and adapted to bridge a pair of contacts 22 in the casing when the plunger is in retracted position. These contacts are located in the circuit. Thus when the plunger is pulled upon to move the cam shaft to inoperative position, the arm will be moved out of engagement with the contacts so that the ignition circuit will be broken. The arm is held against rotary movement with the plunger by the rods 23.

When the plunger is pulled forwardly, a projection 24 thereon will ride over a projection 25 on a spring pressed plate 26 located in a chamber at the bottom of the casing so that the two projections will hold the plunger projected with the cam shaft in inoperative position and the ignition circuit broken. In order to permit the plunger to return to normal position, said plunger is given a slight turning movement to cause the projections to clear each other and thus permit the springs to return the parts to normal position.

I also provide means for preventing the depression of the clutch pedal when the motor is held against operation by the before mentioned means and such means comprises a sliding shaft 27 supported under the floor boards adjacent the pedals and connected to a part of the flexible member 17 by a flexible member 28 enclosed in a flexible conduit 29 so that when the plunger is pulled upon, the shaft will be moved to a position where a part thereof will come against a part of the clutch pedal so that the pedal cannot be depressed. When the shaft 27 is in normal position, a small crank part 30 thereon will be opposite the pedal so that the pedal can be depressed. A large crank part 31 is arranged opposite the brake pedal so that the shaft will not interfere with the movement of the brake pedal in either position of the shaft. The shaft is held in normal position by a spring 32. This prevents the clutch pedal being depressed when the invention is in operation so that it is impossible to free the wheels.

In order to permit the invention to be used as a theft prevention device, I provide means for locking the plunger in projected position, such means comprising a lock 33 located in the front part of the casing 19 and having its bolt 34 engaging a groove 35 in the plunger when the lock is in locking position.

I also provide means for locking the hood in closed position when the plunger is projected so that the hood cannot be raised in an attempt to tamper with the parts to render the same ineffective. Such means consists of the sliding bars 36, supported by the brackets 37 located adjacent the lower edges of the hood sections, and carrying the pins 38 for engaging the eye members 39 carried respectively by the hood sections and the flanges placed inwardly of the lower edges of the sections. Thus when the bent ends of the pins are passed through the eye members, the hood sections cannot be raised. These parts are normally held in unlocking position by the springs 40 and their front ends are connected with a part of the flexible member 17 by the flexible members 41 passing through the conduits 42. Thus when the plunger is pulled upon, the locking bars 36 will be moved to a position to lock the hood sections in closed position. Grease cups 42 are carried by the conduits so that the members within the same can be lubricated.

Thus when the plunger is pulled forwardly, the motor of the vehicle is changed to a brake, the clutch pedal is prevented from being moved to releasing position and the ignition circuit is broken and the motor cannot be started until the plunger returns to its normal position and this cannot be done unless the lock is unlocked. The forward movement of the plunger also locks the hood sections in closed position so that access is prevented to the parts under the hood.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a motor vehicle including its motor, the cam shaft of the motor, the ignition circuit of the motor and the clutch pedal, means for supporting the cam shaft for longitudinal movement, means for holding the shaft in normal position, a plunger, means operated thereby for moving the shaft to a position where its cams will be out of alignment with the tappets, means operated by the plunger for breaking the ignition circuit and means operated by the plunger for preventing movement of the clutch pedal.

In testimony whereof I affix my signature.

GEORGE H. E. LYONS.